US012794148B2

(12) United States Patent
Yoshida et al.

(10) Patent No.: US 12,794,148 B2
(45) Date of Patent: Nov. 10, 2026

(54) VEHICULAR GLASS MODULE

(71) Applicant: NIPPON SHEET GLASS COMPANY, LIMITED, Tokyo (JP)

(72) Inventors: Minoru Yoshida, Tokyo (JP); Kazuhisa Ono, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 382 days.

(21) Appl. No.: 18/572,222

(22) PCT Filed: Jun. 28, 2022

(86) PCT No.: PCT/JP2022/025695

§ 371 (c)(1),
(2) Date: Dec. 20, 2023

(87) PCT Pub. No.: WO2023/276997

PCT Pub. Date: Jan. 5, 2023

(65) Prior Publication Data

US 2024/0291172 A1 Aug. 29, 2024

(30) Foreign Application Priority Data

Jun. 30, 2021 (JP) ................................ 2021-109364

(51) Int. Cl.
*H01R 4/02* (2006.01)
*H05B 3/84* (2006.01)

(52) U.S. Cl.
CPC ................ *H01R 4/02* (2013.01); *H05B 3/84* (2013.01)

(58) Field of Classification Search
None
See application file for complete search history.

(56) References Cited

U.S. PATENT DOCUMENTS

| | | | | |
|---|---|---|---|---|
| 10,305,239 | B2 * | 5/2019 | Degen | B23K 1/06 |
| 2012/0205152 | A1 | 8/2012 | Rateiczak et al. | |
| 2013/0333929 | A1 * | 12/2013 | Ogawa | B23K 35/262 174/257 |
| 2014/0182932 | A1 | 7/2014 | Cholewa et al. | |
| 2015/0296569 | A1 | 10/2015 | Gobain | |
| 2017/0312859 | A1 * | 11/2017 | Tokiwa | B23K 35/36 |

(Continued)

FOREIGN PATENT DOCUMENTS

| | | | | |
|---|---|---|---|---|
| CN | 107710510 B | * | 2/2020 | H01R 12/91 |
| DE | 112019002864 T5 | * | 5/2021 | B60J 1/002 |

(Continued)

*Primary Examiner* — Tho D Ta
(74) *Attorney, Agent, or Firm* — SZDC Law PC

(57) ABSTRACT

A vehicular glass module includes: a glass panel; an electric conductor disposed along a plate surface of a glass panel and including a power supply section in an end part; at least one connection terminal which supplies electric power to the power supply section and which is made of a conductive material having a linear thermal expansion coefficient different from the glass panel; and a lead-free solder bonding the connection terminal to the power supply section to electrically connect the electric conductor to the connection terminal. The connection terminal includes a plate-shaped seating surface section facing the power supply section, and the lead-free solder has a thickness equal to or more than two-thirds of a thickness of the seating surface section.

11 Claims, 9 Drawing Sheets

(56) References Cited

U.S. PATENT DOCUMENTS

| | | | | |
|---|---|---|---|---|
| 2018/0200997 | A1* | 7/2018 | Tokiwa .................... | H05B 3/84 |
| 2018/0220523 | A1 | 8/2018 | Gobain | |

FOREIGN PATENT DOCUMENTS

| | | | | |
|---|---|---|---|---|
| EP | 3199286 | A1 | 8/2017 | |
| JP | 2006507946 | A | 3/2006 | |
| JP | 2017010705 | A | 1/2017 | |
| JP | 2017147229 | A | 8/2017 | |
| JP | 2016505195 | A | 2/2019 | |
| JP | 2020061277 | A | 4/2020 | |
| JP | 2020181786 | A | 11/2020 | |
| WO | WO-2012118203 | A1 * | 9/2012 | ........... H01Q 1/1271 |

* cited by examiner

VEHICULAR GLASS MODULE

This application is the National Stage Application of PCT/JP2022/025695, filed on Jun. 28, 2022, which claims priority to Japanese Patent Application No. 2021-109364, filed on Jun. 30, 2021, which is incorporated by reference for all purposes as if fully set forth herein.

TECHNICAL FIELD

The present invention relates to a vehicular glass module.

BACKGROUND ART

For example, Patent Literature 1 discloses a vehicular glass module including a connection terminal electrically connected to an electric conductor (an "electrically-conductive film" in Patent Literature 1) laminated on a plate surface of a glass plate. The connection terminal is fixed to the electric conductor on the glass plate via a lead-free solder. Lead is harmful to human bodies and adversely affects natural environment as waste. Because of this, in recent years, the use of a lead-free solder including little solder, instead of a leaded solder, has been recommended. The lead-free solder is made of an alloy of tin, silver, and copper, for example, and is harder than the leaded solder.

CITATION LIST

Patent Literature

Patent Literature 1: Japanese Unexamined Patent Application Publication No. 2020-181786

SUMMARY OF INVENTION

Technical Problem

The vehicular glass module in Patent Literature 1 includes a seating surface section (a "mounting section" in Patent Literature 1) provided in one end of the connection terminal such that the seating surface section is fixed to the electric conductor by the lead-free solder. Further, in the vehicular glass module, the seating surface section has a projection (a "protrusion" in Patent Literature 1) projecting toward the glass plate as a spacer allowing the lead-free solder to be uniform in thickness. The seating surface section in the connection terminal is made of metal, and the projection is formed by extrusion of metal. Because of this, the projection can be formed to have a projection height that is only around 60% of the thickness of the seating surface section of the connection terminal. The thickness of the lead-free solder between the seating surface section of the connection terminal and the electric conductor is set in accordance with the projection length of the projection of the seating surface section. Here, in a case where the thickness of the lead-free solder is small, it is difficult to secure the bonding strength of the lead-free solder sufficiently. Further, when the lead-free solder in a molten state is cooled, the lead-free solder becomes harder than the leaded solder, and the lead-free solder with a small thickness easily receives a stress intensively at a peripheral edge part of a boundary between the lead-free solder and the electric conductor due to a thermal expansion difference between the seating surface section and the glass plate. This easily causes cracks in the peripheral edge part. As a result, the lead-free solder between the seating surface section and the electric conductor cannot maintain the connection terminal to be connected to the glass plate appropriately. In the meantime, in order to increase the thickness of the lead-free solder, it is necessary to increase the thickness of the seating surface section to increase the projection length of the projection in the seating surface section. This increases the cost for the connection terminal in the vehicular glass module. Thus, there is room for improvement in fixing a connection terminal to an electric conductor laminated on a glass plate by use of a lead-free solder in a vehicular glass module.

In view of this, it is desired to achieve a vehicular glass module which can sufficiently secure the bonding strength of a connection terminal to an electric conductor by a lead-free solder and which can maintain the connection terminal to be connected to a glass panel appropriately.

Solution to Problem

A vehicular glass module according to the present invention has a feature configuration as follows. That is, the vehicular glass module includes: a glass panel; an electric conductor disposed along a plate surface of the glass panel and including a power supply section in an end part; at least one connection terminal configured to supply electric power to the power supply section, the at least one connection terminal being made of a conductive material having a linear thermal expansion coefficient different from the glass panel; and a lead-free solder bonding the connection terminal to the power supply section to electrically connect the electric conductor to the connection terminal. The connection terminal includes a plate-shaped seating surface section facing the power supply section, and the lead-free solder has a thickness equal to or more than two-thirds of a thickness of the seating surface section.

In the vehicular glass module, the lead-free solder can be used at the time when the connection terminal is bonded to the power supply section of the electric conductor disposed on the glass panel. However, the lead-free solder disposed between the power supply section and the connection terminal becomes harder than a leaded solder when the lead-free solder is cooled from a molten state. Further, since a stress concentrates on a peripheral edge part of a boundary between the lead-free solder and the power supply section due to a thermal expansion difference between the connection terminal and the glass panel, a crack easily occurs in the peripheral edge part. In view of this, in this configuration, the connection terminal includes the plate-shaped seating surface section facing the power supply section, and the thickness of the lead-free solder is equal to or more than two-thirds of the thickness of the seating surface section. Since the thickness of the lead-free solder is equal to or more than two-thirds of the thickness of the seating surface section, the lead-free solder disposed between the seating surface section and the power supply section can sufficiently secure its bonding strength. Further, when the thickness of the lead-free solder is equal to or more than a predetermined thickness, the heat capacity of the lead-free solder increases and absorbs a thermal expansion difference between the seating surface section and the glass panel, so that the lead-free solder can relieve stress concentration on the peripheral edge part of the boundary between the lead-free solder and the power supply section. As a result, the lead-free solder can restrain the occurrence of cracks in the peripheral edge part of the boundary between the lead-free solder and the power supply section.

Another feature configuration is that the lead-free solder has an elongation percentage smaller than an Sn—Pb based solder.

When the lead-free solder has an elongation percentage smaller than the Sn—Pb based solder as a leaded solder like this configuration, a stress easily concentrates on the peripheral edge part of the boundary between the lead-free solder and the power supply section. However, since the thickness of the lead-free solder is equal to or more than two-thirds of the thickness of the seating surface section, the lead-free solder can relieve stress concentration on the peripheral edge part of the boundary between the lead-free solder and the power supply section.

Another feature configuration is that the seating surface section and the plate surface of the glass panel are disposed generally in parallel to each other, the plate surface facing the seating surface section.

When the seating surface section and the plate surface of the glass panel, facing the seating surface section, are disposed generally in parallel to each other like this configuration, the thickness of the lead-free solder disposed therebetween is uniform. As a result, the lead-free solder in a molten state is easy to be cooled uniformly, thereby making it possible to restrain a stress from locally concentrating in the lead-free solder.

Another feature configuration is that the lead-free solder has an intermediate region between the seating surface section and the power supply section such that the intermediate region is formed to be hollowed inwardly relative to both end regions in contact with the seating surface section and the power supply section, respectively.

In the vehicular glass module, the lead-free solder disposed between the seating surface section of the connection terminal and the power supply section on the glass panel side is such that both end regions in contact with the seating surface section and the power supply section, respectively, are easy to be cooled, and the intermediate region between the seating surface section and the power supply section is hard to be cooled. Because of this, it is difficult to uniformly cool the both end regions and the intermediate region. However, in this configuration, since the intermediate region of the lead-free solder is formed to be hollowed inwardly relative to the both end regions, the intermediate region that is hard to be cooled in the lead-free solder is narrow. With this configuration, the intermediate region of the lead-free solder becomes easy to be cooled, so that the lead-free solder is cooled off uniformly and easily hardened. Hereby, it is possible to relieve stress concentration on the peripheral edge part of the boundary between the lead-free solder and the power supply section. Further, in the lead-free solder, the heat capacity of a region close to the boundary between the lead-free solder and the power supply section increases in comparison with the intermediate region, thereby making it possible to relieve stress concentration on the peripheral edge part of the boundary between the lead-free solder and the power supply section.

Another feature configuration is that the lead-free solder present between the seating surface section and the power supply section has a volume equal to or less than a product of a contact area of the seating surface section with the lead-free solder and a separated distance from the seating surface section to the power supply section.

In the lead-free solder between the seating surface section of the connection terminal and the power supply section, when a region along the plate surface of the glass panel expands from the seating surface section toward the power supply section, a stress easily concentrates on the peripheral edge part of the boundary between the lead-free solder and the power supply section, the peripheral edge part having a thin thickness. In view of this, in this configuration, the volume of the lead-free solder present between the seating surface section and the power supply section is equal to or less than the product of the contact area of the seating surface section with the lead-free solder and the separated distance from the seating surface section to the power supply section. Hereby, the contact area of the lead-free solder with the power supply section easily becomes equal to or less than the contact area with the seating surface section of the connection terminal, and the lead-free solder is hard to expand in a direction along the plate surface of the glass panel, in the vicinity of the power supply section. As a result, it is possible to easily relieve stress concentration on the peripheral edge part of the boundary between the lead-free solder and the power supply section.

Another feature configuration is that the lead-free solder has a contact area with the seating surface section, the contact area being equal to or more than a contact area with the power supply section.

When the contact area of the lead-free solder with the power supply section is larger than the contact area thereof with the seating surface section of the connection terminal like this configuration, the heat capacity of the lead-free solder near the seating surface section increases, so that a stress caused due to contraction of the lead-free solder near the seating surface section is absorbed. Hereby, the stress can be made hard to be transferred to the lead-free solder near the power supply section. As a result, it is possible to easily relieve stress concentration on the peripheral edge part of the boundary between the lead-free solder and the power supply section.

Another feature configuration is that the seating surface section further includes a projection projecting toward the electric conductor.

When the seating surface section of the connection terminal has a projection like this configuration, heat of the lead-free solder in the molten state is transmitted to the projection, so that the intermediate region is cooled off immediately. This makes it possible to decrease a temperature difference in the whole lead-free solder, so that the lead-free solder is cooled off uniformly and easily hardened. As a result, the lead-free solder can relieve stress concentration on the peripheral edge part of the boundary between the lead-free solder and the power supply section.

Another feature configuration is that the lead-free solder has a thickness larger than a length of the projection in a direction perpendicular to the plate surface of the glass panel.

With this configuration, the lead-free solder disposed between the seating surface section of the connection terminal and the power supply section has a region in contact with the projection and a region in no contact with the projection in a direction perpendicular to the plate surface of the glass panel. In the lead-free solder, the region in no contact with the projection has a heat capacity larger than that of the region in contact with the projection. Accordingly, in the lead-free solder, it is possible to relieve stress concentration on the peripheral edge part of the boundary between the lead-free solder and the power supply section, the peripheral edge part being a region in no contact with the projection in the seating surface section.

Another feature configuration is that the connection terminal is made of an alloy mainly containing copper.

The connection terminal made of a conductive material can be formed by use of various metals, but copper has a high electrical conductivity and a high thermal conductivity among the metals. Accordingly, when the connection terminal is made of an alloy mainly containing copper like this configuration, it is possible to immediately cool the lead-free solder in the molten state by contact with the connection terminal. Hereby, it is possible to restrain a stress from locally concentrating in the lead-free solder.

Another feature configuration is that the glass panel is constituted by laminated glass including a first glass plate on a vehicle outer side and a second glass plate on a vehicle inner side such that the first glass plate and the second glass plate are disposed to face each other.

In a case where the glass panel is laminated glass with the first glass plate and the second glass plate that are disposed to face each other like this configuration, the glass panel has a small surface compressive stress as compared with a case where the glass panel is constituted by tempered glass. On that account, a crack easily occurs in the lead-free solder for fixing the seating surface section of the connection terminal to the electric conductor. However, since the thickness of the lead-free solder is secured to be equal to or more than two-thirds of the thickness of the seating surface section, it is possible to relieve stress concentration on the peripheral edge part of the boundary between the lead-free solder and the power supply section. As a result, it is possible to restrain the occurrence of cracks in the lead-free solder.

Another feature configuration is that: the vehicular glass module further includes a shielding layer disposed in a peripheral region of the glass panel; the power supply section is disposed on the shielding layer; and the lead-free solder is an Sn—Ag based solder.

In a case where the shielding layer is provided in the glass panel like this configuration, ceramic in deep color such as black, for example, is used as the shielding layer. In this case, a tensile stress occurs on the surface of the glass panel due to an expansion coefficient difference between the glass panel and the shielding layer. At this time, in a case where the lead-free solder for bonding the seating surface section of the connection terminal to the power supply section is an Sn—Ag based solder, the shielding layer may crack due to a low ductility of the Sn—Ag based solder. However, since the thickness of the Sn—Ag based solder as the lead-free solder is secured to be equal to or more than two-thirds of the thickness of the seating surface section, it is possible to relieve stress concentration on the peripheral edge of the boundary between the Sn—Ag based solder and the power supply section. This can also relieve a stress applied to the shielding layer, thereby making it possible to restrain the occurrence of cracks in the shielding layer.

DESCRIPTION OF EMBODIMENTS

The following describes embodiments of a vehicular glass module according to the present invention, with reference to the drawings. However, the present invention is not limited to the following embodiments and is modifiable in various manners as far as it does not deviate from the gist of the present invention.

First Embodiment

Figure 1:
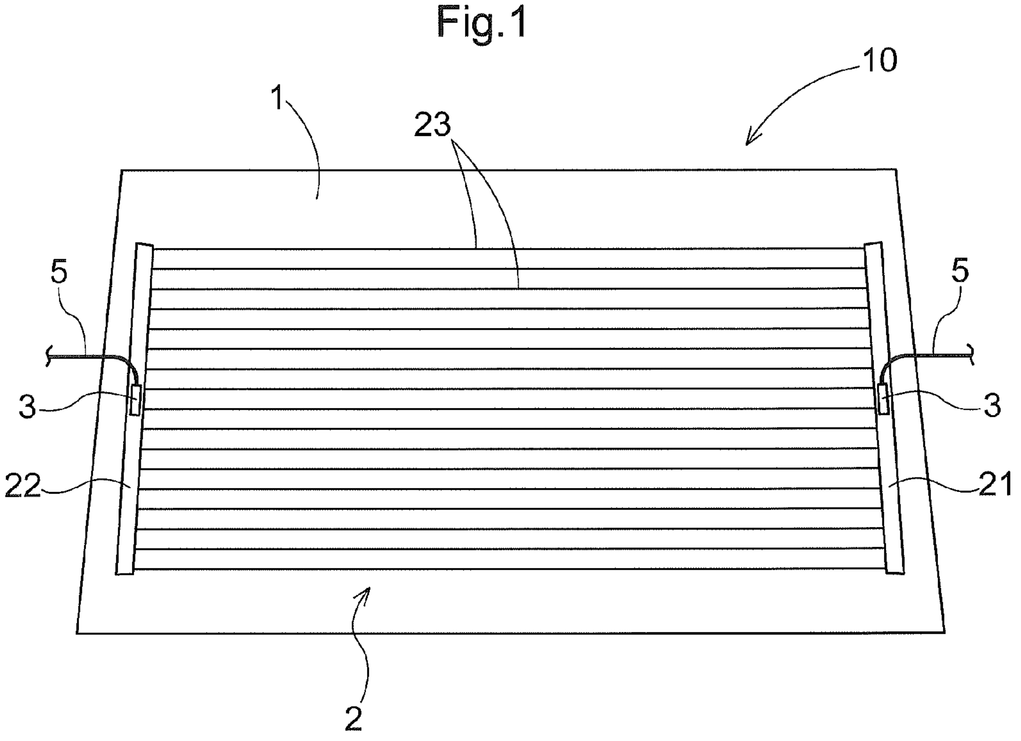
FIG. 1 is a plan view of a vehicular glass module according to a first embodiment.

As illustrated in FIG. 1, a vehicular glass module 10 (hereinafter referred to as a "glass module 10") includes a glass panel 1, a defogger 2 (an example of an electric conductor) laminated on the glass panel 1, and a pair of connection terminals 3 attached to the defogger 2 by a lead-free solder 4. A cable 5 for power supply that extends from inside a vehicle is attached to each of the connection terminals 3, so that a current supplied from the cable 5 is supplied to the defogger 2 through the connection terminal 3. The following describes each member.

1. Glass Panel

A well-known glass plate for automobiles is usable as the glass panel 1. For example, heat absorbing glass, general clear glass or green glass, or UV green glass may be used as the glass panel 1. However, it is necessary for the glass panel 1 to achieve visible light transmission in conformity with the safety standard of a country where the automobiles are used. For example, the glass panel 1 can be adjusted such that its solar absorptance, visible light transmission, or the like satisfies the safety standard.

The following describes one example of the composition of clear glass and one example of the composition of heat absorbing glass.

(Clear Glass)

$SiO_2$: 70% to 73% by mass $Al_2O_3$: 0.6% to 2.4% by mass

CaO: 7% to 12% by mass

MgO: 1.0% to 4.5% by mass

R2O: 13% to 15% by mass (R is alkali metal)

total iron oxide ($T\text{-}Fe_2O_3$) in terms of $Fe_2O_3$: 0.08% to 0.14% by mass (Heat Absorbing Glass)

The composition of heat absorbing glass can be, for example, a composition obtained on the basis of the composition of clear glass such that the ratio of total iron oxide ($T\text{-}Fe_2O_3$) in terms of $Fe_2O_3$ is set to 0.4% to 1.3% by mass, the ratio of $CeO_2$ is set to 0% to 2% by mass, the ratio of $TiO_2$ is set to 0% to 0.5% by mass, and the composition of framework components (mainly $SiO_2$ and $Al_2O_3$) of glass is reduced just by respective increased amounts of $T\text{-}Fe_2O_3$, $CeO_2$, and $TiO_2$.

Note that the type of the glass panel 1 is not limited to clear glass or heat absorbing glass and is selectable appropriately in accordance with embodiments. For example, the glass panel 1 may be a window made of acryl-based resin, polycarbonate-based resin, or the like.

Further, the thickness of the glass panel 1 according to the present embodiment may not be limited particularly. However, from the viewpoint of lightweighting, the thickness of the glass panel 1 may be set in a range of 2.2 mm to 5.1 mm, may be set in a range of 2.4 mm to 3.8 mm, or may be set in a range of 2.7 mm to 3.2 mm. Further, the thickness of the glass panel 1 may be set to be 3.1 mm or less, 2.0 mm or less, or 1.6 mm or less.

Further, the glass panel 1 may be a single glass plate or may be laminated glass with an interlayer made of resin or the like being sandwiched between a plurality of pieces of glass. The thickness of each of glass plates constituting the laminated glass is also not limited particularly, but one of the glass plates can have a thickness of 1.6 mm, and the other one of the glass plates can have a thickness of 2.0 mm, for example. Further, the thickness of one of the glass plates can be 0.3 mm. As such, the glass plate can be set in a range of 0.2 mm to 5.1 mm appropriately.

2. Defogger

Next will be described the defogger 2. As illustrated in FIG. 1, the defogger 2 (an example of the electric conductor) is disposed along a plate surface of the glass panel 1 and includes paired bus bars 21, 22 (an example of a power supply section) in end parts of the defogger 2, and heating lines 23. In the defogger 2, the paired bus bars 21, 22 extend in an up-down direction along opposite side edges of the glass panel 1. Further, a plurality of heating lines 23 extends horizontally between the paired bus bars 21, 22 to be disposed in parallel to each other at predetermined intervals.

As illustrated in FIG. 1, a first bus bar 21 out of the paired bus bars 21, 22 is disposed on the right side of the glass panel 1, and a second bus bar 22 is disposed on the left side of the glass panel 1. The connection terminals 3 disposed at respective end parts of the cables 5 are attached to the paired bus bars 21, 22. A current is supplied from the cable 5 to the first bus bar 21 via the connection terminal 3, and the second bus bar 22 is grounded via the connection terminal 3 and the cable 5. With this configuration, when the current is supplied to the defogger 2, heat for defogging is generated in the heating lines 23. Note that the paired bus bars 21, 22 and the heating lines 23 are formed, for example, by printing and burning electrically-conductive silver paste on the surface of the glass panel 1. However, the material for forming the defogger 2 is not limited to silver paste and is selectable appropriately.

3. Connection Terminal

Figure 2:
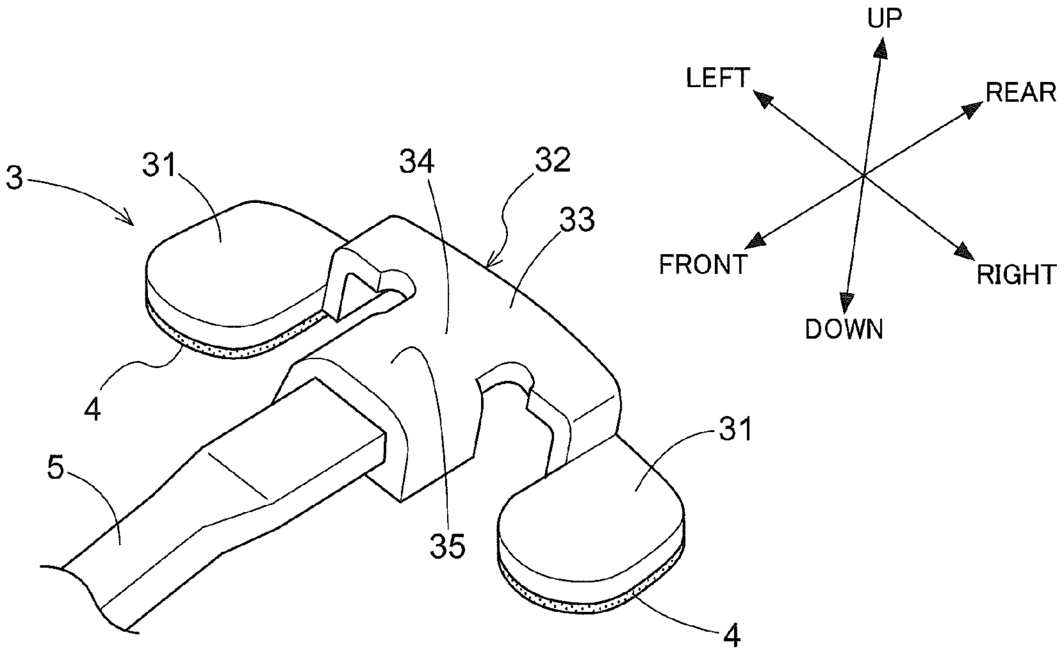
FIG. 2 is a perspective view of a connection terminal.
Figure 3:
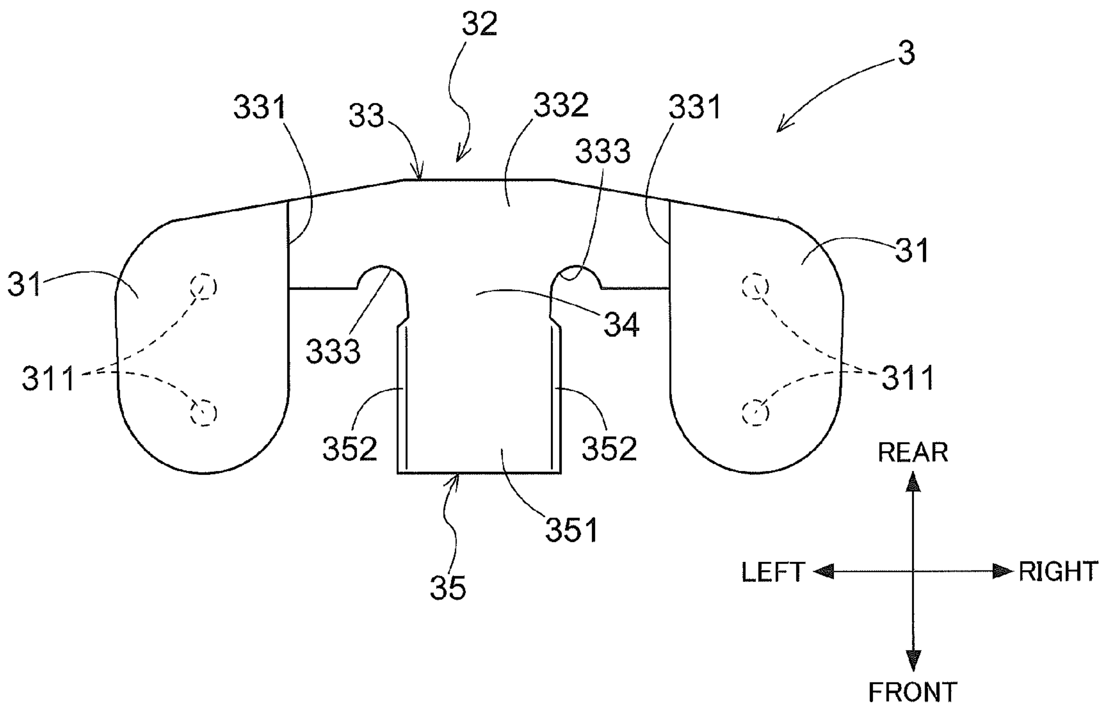
FIG. 3 is a plan view of the connection terminal.
Figure 4:
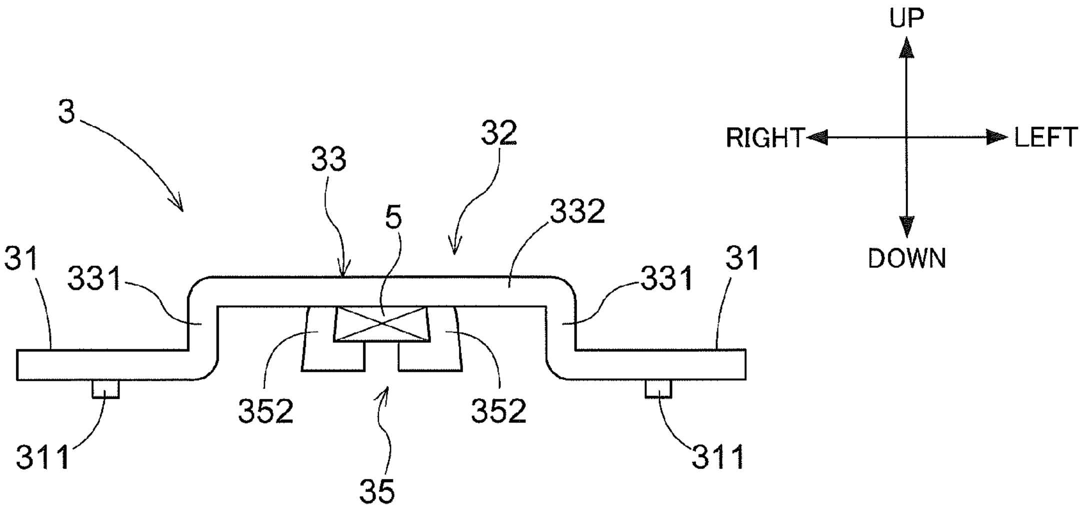
FIG. 4 is a side view of the connection terminal.

The following describes the connection terminal 3 with reference to FIGS. 2 to 4. The following description is made with reference to directions illustrated in FIGS. 2 to 4 for the convenience of the description.

As illustrated in FIGS. 2 to 4, the connection terminal 3 includes paired seating surface sections 31 and a base section 32, and the seating surface sections 31 and the base section 32 are formed integrally by bending a plate-shaped conductive material made of metal or the like, for example. The connection terminal 3 is made of a conductive material having a linear thermal expansion coefficient different from that of the glass panel 1. The connection terminal 3 is made of an alloy mainly containing copper, for example, and it is preferable to employ a copper-zinc alloy, tough-pitch steel (C1100R), brass (C2600), or a copper alloy (NB-109) as the conductive material.

Each seating surface section 31 is disposed on the bus bar 21, 22 of the defogger 2 and is formed in a plate shape. Each seating surface section 31 is formed into a rectangular shape as a whole, but its corners are formed in an arcuate shape. Further, each seating surface section 31 has a bottom surface fixed to the bus bar 21, 22 via the lead-free solder 4 (described later). Note that the seating surface section 31 has a shape with curved corners, and this restrains stress concentration (described later).

As illustrated in FIG. 4, each seating surface section 31 includes columnar projections 311 projecting toward the bus bar 21, 22 (the electric conductor). The projections 311 are formed on the bottom surface of each seating surface section 31. As will be described later, the projections 311 form a gap between the seating surface section 31 and the bus bar 21, 22, and the lead-free solder 4 is disposed to bury the gap.

Two seating surface sections 31 are connected to each other by the base section 32. More specifically, the base section 32 includes a first part 33, a second part 34, and a third part 35. The first part 33 includes paired upright sections 331 rising from rear end sides of side edges of the seating surface sections 31, and a main body 332 extending horizontally to connect the upright sections 331 to each other, such that the first part 33 is formed to have a reversed U-shape as a whole in a front view. The second part 34 extends forward from a front end of the main body 332. Further, the third part 35 extending in a belt shape in a right-left direction is further connected to a front end of the second part 34.

The width of the second part 34 in the right-left direction is smaller than that of the main body 332. Further, a connecting part of the main body 332 with the second part 34 has semicircular notches 333 at positions corresponding to opposite ends of the second part 34.

As illustrated in FIGS. 3, 4, the third part 35 includes a rectangular support section 351 connected to the second part 34, and paired extending sections 352 extending downward from opposite sides of the support section 351, before the cable 5 is connected thereto. The width of the support section 351 in the right-left direction is wider than the second part 34. As illustrated in FIGS. 3, 4, the third part 35 surrounds the cable 5 by the support section 351 and the paired extending sections 352. When the third part 35 is crimped, the cable 5 is fixed to the third part 35.

4. Lead-Free Solder

The lead-free solder 4 is not limited particularly, and an indium-based lead-free solder, a bismuth-based lead-free solder, an Sn—Ag based lead-free solder, or the like can be used, for example. Particularly, the indium-based lead-free solder is a material softer than a tin-silver based lead-free solder, for example, and therefore can restrain breakage of the glass plate by residual stress. Further, it is preferable to use soft lead-free solder such as the indium-base lead-free solder having a melting point of 150° C. or less as the lead-free solder 4 to relieve stress concentration.

5. Attachment of Connection Terminal

Figure 5:
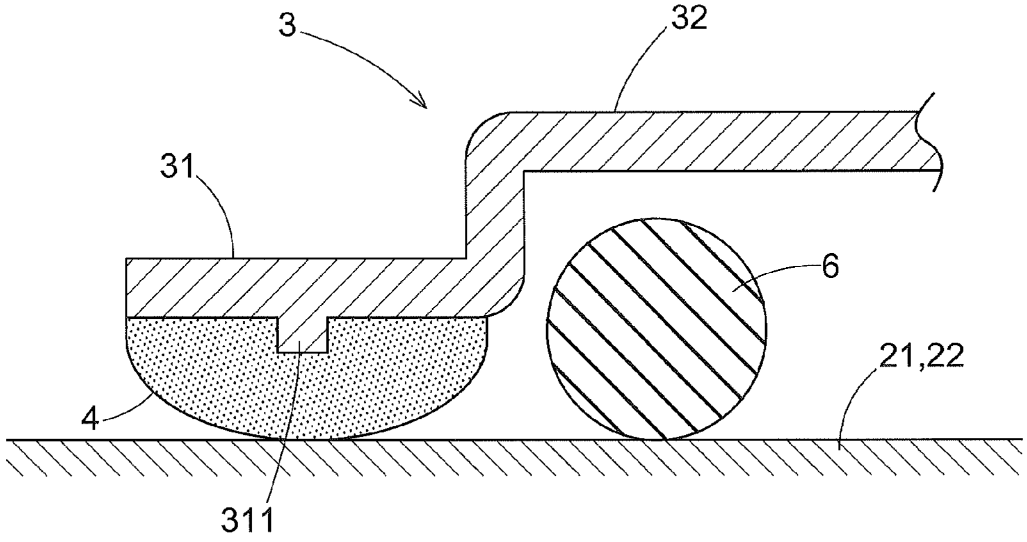
FIG. 5 is a partial sectional side view of the vehicular glass module and illustrating a step of attaching the connection terminal to a glass plate.
Figure 6:
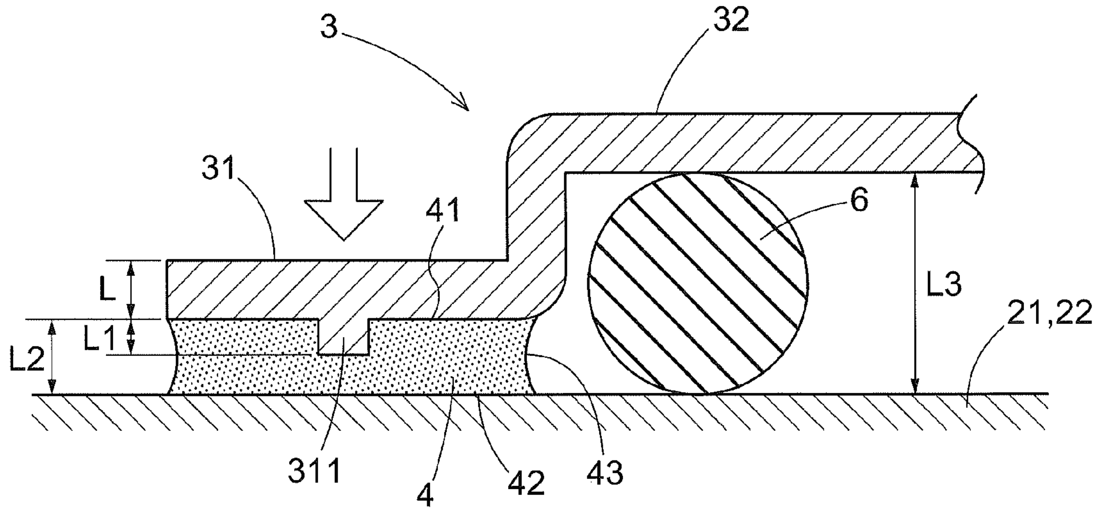
FIG. 6 is a partial sectional side view of the vehicular glass module with the connection terminal being attached to the glass plate.

Next will be described attachment of the connection terminal 3 with reference to FIGS. 5 and 6. First, as illustrated in FIG. 5, the lead-free solder 4 is applied to the bottom surface of the seating surface section 31 of the connection terminal 3.

Subsequently, the connection terminal 3 is fixed to the bus bar 21, 22. More specifically, as illustrated in FIG. 5, while the lead-free solder 4 applied to the seating surface section 31 of the connection terminal 3 is disposed on the bus bar 21, 22, a spacer 6 is disposed between the bus bar 21, 22 and the base section 32. The spacer 6 is used to maintain the distance between the seating surface section 31 and the bus bar 21, 22 to be a separated distance L2 longer than a projection length L1 of the projection 311 (see FIG. 6). Here, the projection length L1 of the projection 311 is a length in a direction perpendicular to the plate surface of the glass panel 1. The spacer 6 has a height L3 allowing the separated distance L2 to be equal to or more than two-thirds of a thickness L of the seating surface section 31 (see FIG. 6). The spacer 6 illustrated in FIGS. 5 and 6 is constituted by an insulator formed in a pillar shape, for example. Further, the spacer 6 is disposed such that its axial center is along the front-rear direction of the connection terminal 3 in a space formed between the upright section 331 and the extending section 352. An insulating material constituting the spacer 6 may be, for example, wood, a rubber material, or the like. The shape of the spacer 6 and the number of spacers 6 are not limited particularly.

Subsequently, the top surface of the seating surface section 31 of the connection terminal 3 is heated. Hereby, heat is transmitted to the lead-free solder 4 via the seating surface section 31, so that the lead-free solder 4 melts. At this time, the lead-free solder 4 melts with the space between the seating surface section 31 and the bus bar 21, 22 being maintained to be the separated distance L2 by the spacer 6. After that, as illustrated in FIG. 6, as the lead-free solder 4 solidifies, the seating surface section 31 is fixed to the bus bar 21, 22. The lead-free solder 4 thus solidifying has a first region 41 in contact with the seating surface section 31 and a second region 42 in contact with the bus bar 21, 22. The lead-free solder 4 is formed such that an intermediate region 43 between the seating surface section 31 and the bus bar 21, 22 is hollowed inwardly relative to both end regions 41, 42 in contact with the seating surface section 31 and the bus bar 21, 22, respectively. That is, the volume of the lead-free solder 4 present between the seating surface section 31 and the bus bar 21, 22 is equal to or less than the product of the contact area of the seating surface section 31 with the lead-free solder 4 and the separated distance L2 from the seating surface section 31 to the bus bar 21, 22. Note that the spacer 6 is removed from the glass module 10 after the lead-free solder 4 solidifies.

6. Effects

The glass module 10 configured as above can achieve the following effects.

In the glass module 10, the lead-free solder 4 can be used at the time when the connection terminal 3 is bonded to the bus bar 21, 22 of the defogger 2 disposed on the glass panel 1. However, the lead-free solder 4 disposed between the bus bar 21, 22 and the connection terminal 3 becomes harder than a leaded solder when the lead-free solder 4 is cooled from a molten state. Further, since a stress concentrates on a peripheral edge part of the boundary between the lead-free solder 4 and the bus bar 21, 22 due to a thermal expansion difference between the connection terminal 3 and the glass panel 1, cracks easily occur in the peripheral edge part. In view of this, in the present embodiment, the connection terminal 3 includes the plate-shaped seating surface section 31 facing the bus bar 21, 22, and a thickness L2 of the lead-free solder 4 is equal to or more than two-thirds of the thickness L of the seating surface section 31. Since the thickness L2 of the lead-free solder 4 is equal to or more than two-thirds of the thickness L of the seating surface section 31, the bonding strength can be sufficiently secured in the lead-free solder 4 disposed between the seating surface section 31 and the bus bar 21, 22. Further, when the thickness L2 of the lead-free solder 4 is equal to or more than a predetermined thickness, the heat capacity of the lead-free solder 4 increases and absorbs the thermal expansion difference between the seating surface section 31 and the glass panel 1, so that the lead-free solder 4 can relieve stress concentration on the peripheral edge part of the boundary between the lead-free solder 4 and the bus bar 21, 22. As a result, the lead-free solder 4 can restrain the occurrence of cracks in the peripheral edge part of the boundary between the lead-free solder 4 and the bus bar 21, 22.

Further, the lead-free solder 4 made of an indium-based solder or the like having a low melting point is softer than an Sn—Ag based lead-free solder, for example. Accordingly, it is possible to relieve a force to be applied from the seating surface section 31 to the bus bar 21, 22 via the lead-free solder 4 when the force as described above works, thereby making it possible to further restrain detachment of the connection terminal 3. However, the lead-free solder 4 having such a low melting point has the possibility that, when the switch of the defogger 2 is turned on by mistake under high temperature in a desert or a beach in midsummer, for example, the temperature of the lead-free solder 4 increases to a temperature near its melting point, and the adhesive strength of the lead-free solder 4 may slightly decrease. In this regard, the Sn—Ag based lead-free solder 4 is harder than the indium-based lead-free solder 4 and has a low stress relaxation effect, but its melting point is high, so that the decrease in adhesive strength as described above does not occur when the Sn—Ag based lead-free solder 4 is used under high temperature. A solder having an elongation percentage smaller than that of a Sn—Pb-based solder can be used as the lead-free solder 4. In this case, a stress easily concentrates on the peripheral edge part of the boundary between the lead-free solder 4 and the bus bar 21, 22. However, since the thickness L2 of the lead-free solder 4 is equal to or more than two-thirds of the thickness L of the seating surface section 31, the lead-free solder 4 can relieve stress concentration on the peripheral edge part of the boundary between the lead-free solder 4 and the bus bar 21, 22.

Further, since the connection terminal 3 includes the projections 311 formed on the bottom surface of the seating surface section 31, heat of the lead-free solder 4 in the molten state is transmitted to the projections 311, so that the intermediate region 43 of the lead-free solder 4 is cooled off immediately. This makes it possible to decrease a temperature difference in the whole lead-free solder 4, so that the lead-free solder 4 is cooled off uniformly and easily hardened. As a result, the lead-free solder 4 can relieve stress concentration on the peripheral edge part of the boundary between the lead-free solder 4 and the bus bar 21, 22.

Further, in the present embodiment, the lead-free solder 4 disposed between the seating surface section 31 of the connection terminal 3 and the bus bar 21, 22 has a region in contact with the projection 311 and a region in no contact with the projection 311 in a direction perpendicular to the plate surface of the glass panel 1. In the lead-free solder 4, the region in no contact with the projection 311 has a heat capacity larger than that of the region in contact with the projection 311. Accordingly, in the lead-free solder 4, it is possible to relieve stress concentration on the peripheral edge part of the boundary between the lead-free solder 4 and the bus bar 21, 22, the peripheral edge part being the region in no contact with the projection 311.

The connection terminal 3 made of a conductive material can be formed by use of various metals, but copper has a high electrical conductivity and a high thermal conductivity among the metals. Accordingly, when the connection terminal 3 is made of an alloy mainly containing copper like the present embodiment, it is possible to immediately cool the lead-free solder 4 in the molten state by contact with the connection terminal 3. Hereby, it is possible to restrain a stress from locally concentrating in the lead-free solder 4.

Second Embodiment

Figure 7:
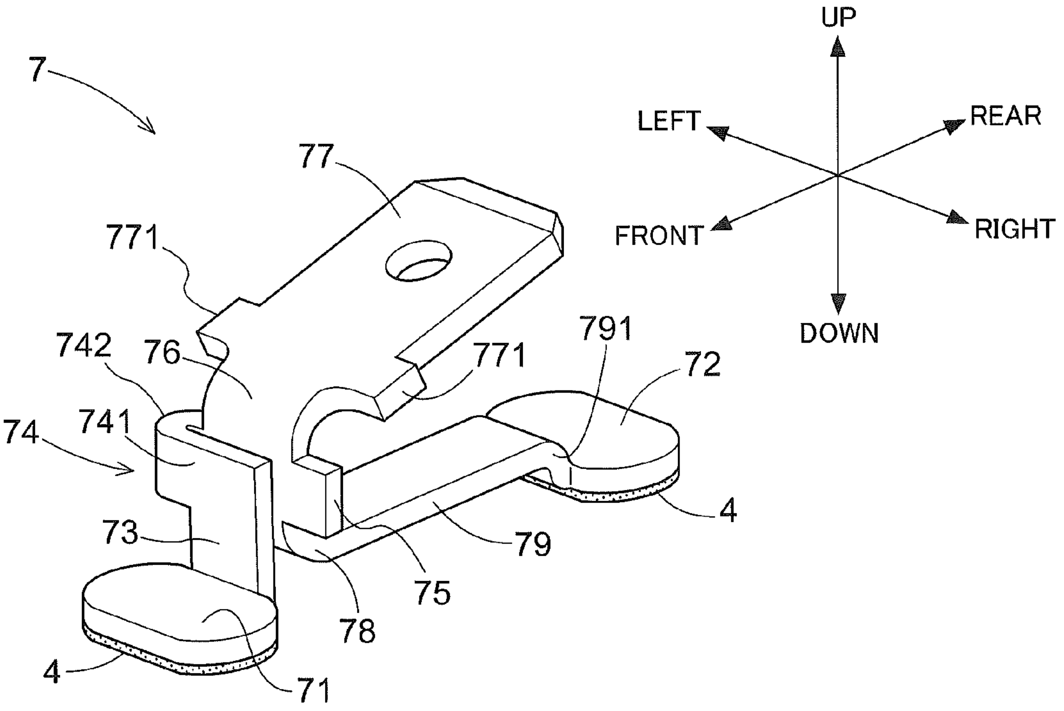
FIG. 7 is a perspective view of a connection terminal according to a second embodiment.
Figure 8:
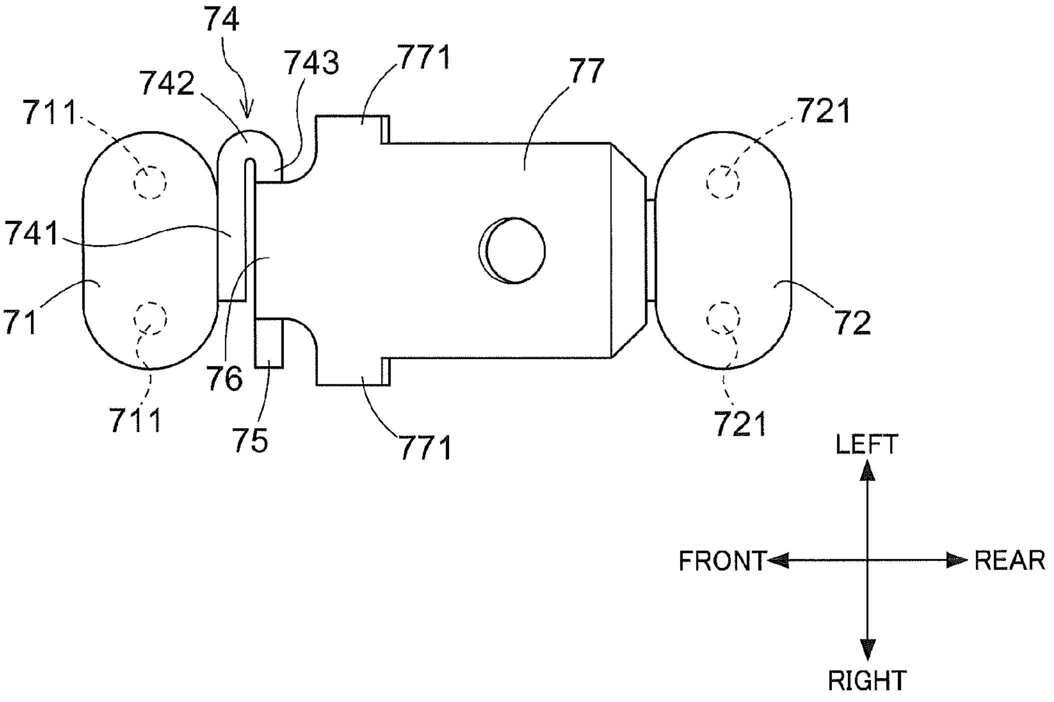
FIG. 8 is a plan view of the connection terminal according to the second embodiment.
Figure 9:
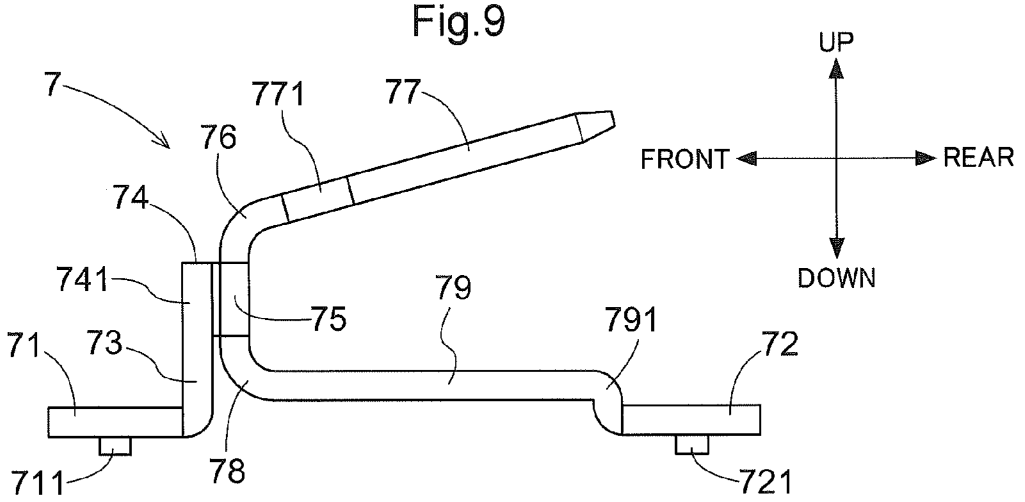
FIG. 9 is a side view of the connection terminal according to the second embodiment.

The glass module 10 may include a connection terminal 7 illustrated in FIGS. 7 to 9. The following describes the connection terminal 7 according to a second embodiment with reference to directions illustrated in FIG. 7 for the convenience of the description.

As illustrated in FIGS. 7 to 9, the connection terminal 7 is formed integrally by bending a plate-shaped conductive material made of metal or the like, for example, and includes paired seating surface sections 71, 72 to be provided on the bus bar 21, 22 of the defogger 2. In the following description, a seating surface section on the left side in FIG. 7 is referred to as a first seating surface section 71, and a seating surface section on the right side is referred to as a second seating surface section 72. The connection terminal 7 is disposed on the bus bar 21, 22 such that the first seating surface section 71 and the second seating surface section 72 are fixed to the bus bar 21, 22.

The first seating surface section 71 is formed in an elliptical shape in a plan view and includes paired columnar projections 711 formed on the bottom surface of the first seating surface section 71 to project downward. Further, a rectangular upright section 73 extending upward from a rear end part of the first seating surface section 71 is connected to the first seating surface section 71. The width of the upright section 73 in the right-left direction is narrower than the width of the first seating surface section 71 in the right-left direction. An impact absorbing section (an easily deformable section) 74 having a U-shape in a plan view is connected to an upper end part of the upright section 73. The impact absorbing section 74 is constituted by a first part 741 having a rectangular shape, a curved section 742, and a second part 743 having a rectangular shape. The first part 741 is connected to an upper end part of the upright section 73. The curved section 742 is connected to a left end part of the first part 741 to project toward the left side and bend rearward into a U-shape. The second part 743 is connected to a right end part of the curved section 742 to be disposed parallel to the first part 741. The first part 741 and the second part 743 are formed into the same shape and disposed via a gap such that their right end parts are at generally the same position.

A rectangular protruding section 75 projecting toward the right side is connected to the right end part of the second part 743 of the impact absorbing section 74. The protruding section 75 projects toward the right side relative to the upright section 73 and the first part 741 of the impact absorbing section 74 and projects to generally the same position as a right end part of the first seating surface section 71.

A connector connecting section 77 having a rectangular shape is connected to an upper end of the second part 743 of the impact absorbing section 74 via a first curved section 76 curved to project upward. That is, the connector connecting section 77 is inclined to be directed upward by the first curved section 76 as it goes rearward. The connector connecting section 77 receives insertion of a connector (not illustrated) for power supply or grounding and includes stoppers 771 disposed on opposite sides of a base end closer to the second part 743 such that the stoppers 771 project in the right-left direction. The stoppers 771 restrict the insertion length of the connector. Note that the stoppers 771 project in the right-left direction generally to respective positions of opposite end parts of the first seating surface section 71.

In the meantime, a coupling section 79 having a rectangular shape is connected to a lower end of the second part 743 of the impact absorbing section 74 via a second curved section 78 extending rearward and curved to project downward. The coupling section 79 extends rearward via the second curved section 78 to be parallel to the seating surface sections 71, 72. The width of the coupling section 79 in the right-left direction is narrow and is generally half of the width of the connector connecting section 77. Further, the length of the coupling section 79 in the front-rear direction is generally the same as that of the connector connecting section 77, and a rear end part of the connector connecting section 77 and a rear end of the coupling section 79 are generally at the same position. The second seating surface section 72 is connected to the rear end part of the coupling section 79 via a third curved section 791 curved downward. The second seating surface section 72 has the same size as the first seating surface section 71 and is disposed on the same plane as the first seating surface section 71 such that they are at the same position in the up-down direction.

Figure 10:
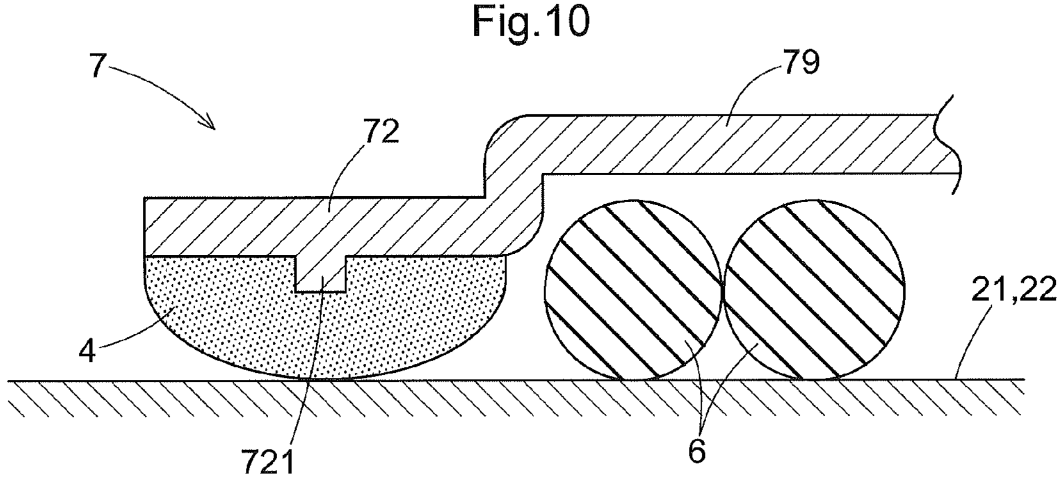
FIG. 10 is a partial sectional side view of the vehicular glass module and illustrating a step of attaching the connection terminal according to the second embodiment to a glass plate.
Figure 11:
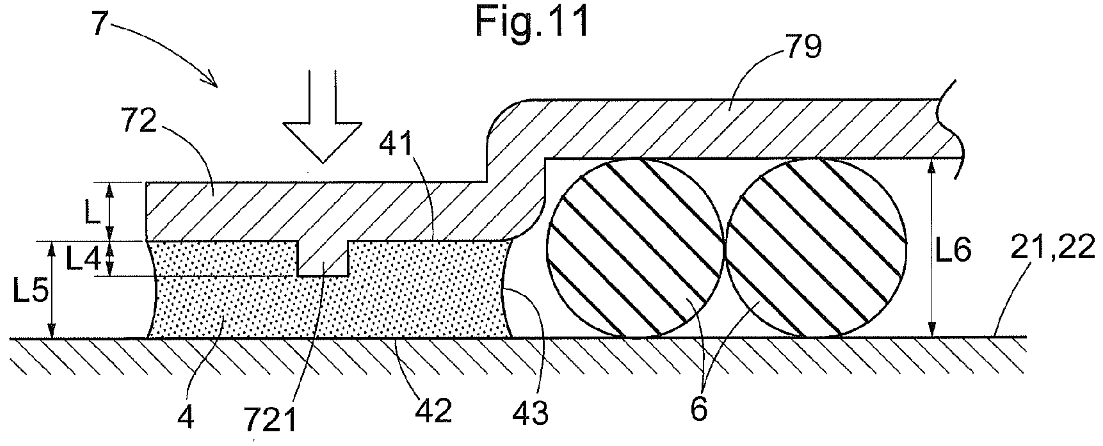
FIG. 11 is a partial sectional side view of the vehicular glass module with the connection terminal of the second embodiment being attached to the glass plate.

The following describes attachment of the connection terminal 7 with reference to FIGS. 10 and 11. FIGS. 10 and 11 illustrate a step of attaching the seating surface section 72 of the connection terminal 7 to the bus bar 21, 22. Although not illustrated herein, the seating surface section 71 of the connection terminal 7 is also attached to the bus bar 21, 22 in the same procedure as the seating surface section 72.

First, as illustrated in FIG. 10, the lead-free solder 4 is applied to the bottom surface of the seating surface section 72 of the connection terminal 7. Subsequently, the connection terminal 7 is fixed to the bus bar 21, 22. More specifically, as illustrated in FIG. 10, while the lead-free solder 4 applied to the seating surface section 72 of the connection terminal 3 is disposed on the bus bar 21, 22, the spacer 6 is disposed between the bus bar 21, 22 and the coupling section 79. The spacer 6 is used to maintain the distance between the seating surface section 31 and the bus bar 21, 22 to be a separated distance L5 longer than a projection length L4 of the projection 721 (see FIG. 11). Here, the spacer 6 has a height L6 allowing the separated distance L5 to be equal to or more than two-thirds of the thickness of the seating surface section 72 (see FIG. 11). The spacer 6 is constituted by a plurality of insulators formed in a pillar shape, for example, and is disposed below the coupling section 79 such that respective axial centers of the insulators are along the front-rear direction of the connection terminal 7. The insulators constituting the spacer 6 may be made of, for example, wood, a rubber material, or the like. The shape of the spacer 6 and the number of spacers 6 are not limited particularly.

Subsequently, the top surface of the seating surface section 72 of the connection terminal 7 is heated. Hereby, heat is transmitted to the lead-free solder 4 via the seating surface section 72, so that the lead-free solder 4 melts. At this time, the lead-free solder 4 melts with the space between the seating surface section 72 and the bus bar 21, 22 being maintained to be the separated distance L5 by the spacer 6. After that, as illustrated in FIG. 11, as the lead-free solder 4 solidifies, the seating surface section 72 is fixed to the bus bar 21, 22. The lead-free solder 4 thus solidifying has a first region 41 in contact with the seating surface section 31 and a second region 42 in contact with the bus bar 21, 22. The lead-free solder 4 is formed such that an intermediate region 43 between the seating surface section 31 and the bus bar 21, 22 is hollowed inwardly relative to both end regions 41, 42 making contact with the seating surface section 31 and the bus bar 21, 22, respectively. The spacer 6 is removed from the glass module 10 after the lead-free solder 4 solidifies.

The following describes examples of the present invention. Note that the present invention is not limited to the following examples.

1. Preparations for Examples

Figure 12:
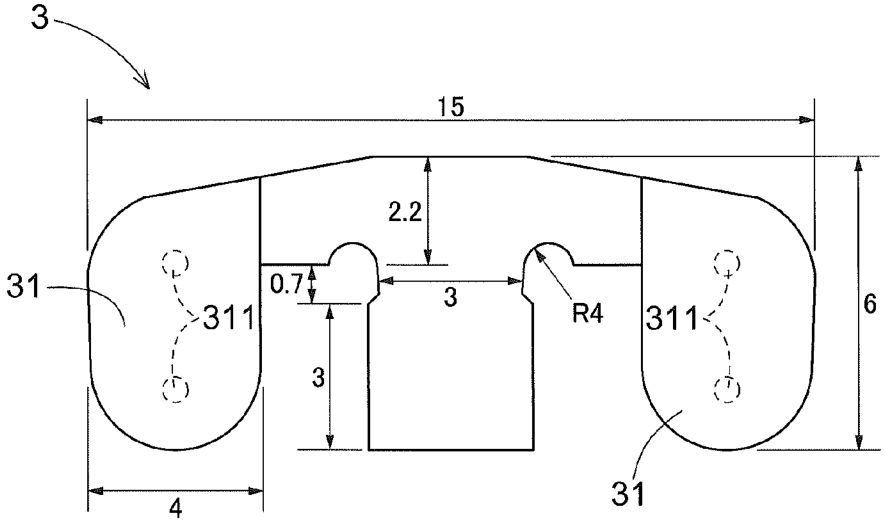
FIG. 12 is a plan view of a connection terminal according to Example 1.
Figure 13:
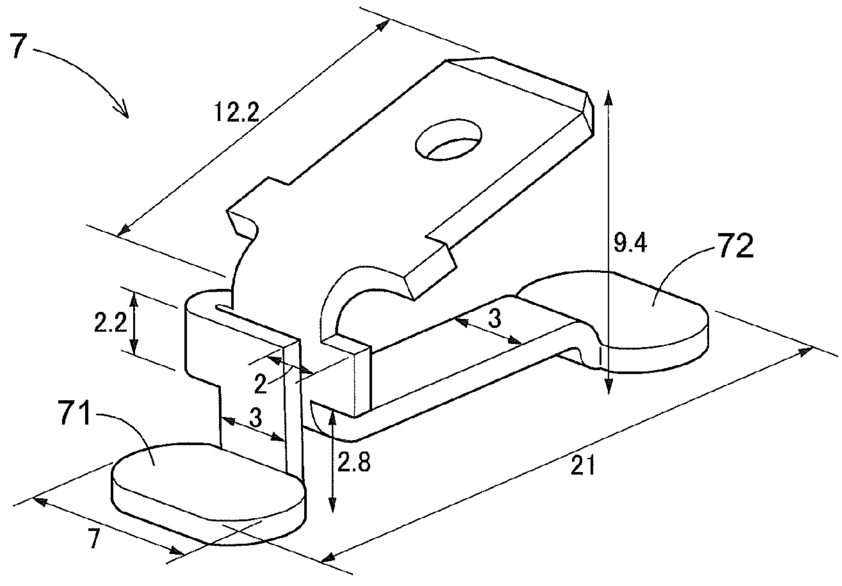
FIG. 13 is a perspective view of a connection terminal according to Example 2.

As Examples 1, 2, connection terminals 3, 7 having the same configurations as described in the above embodiments were manufactured. More specifically, the connection terminals 3, 7 illustrated in FIGS. 12 and 13 were manufactured. The materials for the connection terminals 3, 7 were a copper-zinc alloy. The dimension of the connection terminal 3 in Example 1 is as illustrated in FIG. 12 (unit: mm), and the thickness of seating surface sections 31, 31 is 0.5 [mm]. The dimension of the connection terminal 7 in Example 2 is as illustrated in FIG. 13 (unit: mm), and the thickness of seating surface section 71, 72 is 0.8 [mm]. The seating surface section 31, 31, 71, 72 of the connection terminal 3, 7 of Example 1, 2 configured as such was fixed on an electric conductor (made of Ag and corresponding to the bus bar 21, 22) laminated on a glass plate (an untempered glass plate with a thickness of 2.0 mm) by a lead-free solder 4. As the lead-free solder 4, an Sn-2Ag solder was used. Various types of flax were applied onto the electric conductor in advance, and then, the connection terminal 3, 7 was fixed thereto by the lead-free solder 4.

Figure 14A:
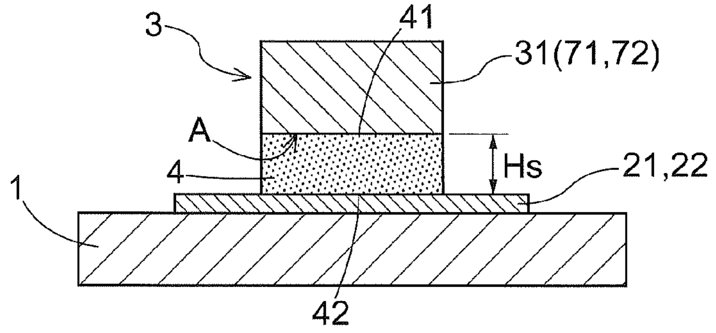
FIG. 14A is a view illustrating an example of the shape of a lead-free solder.
Figure 14B:
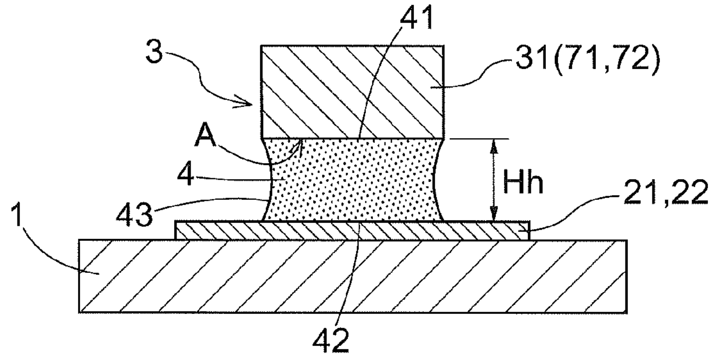
FIG. 14B is a view illustrating an example of the shape of the lead-free solder.
Figure 14C:
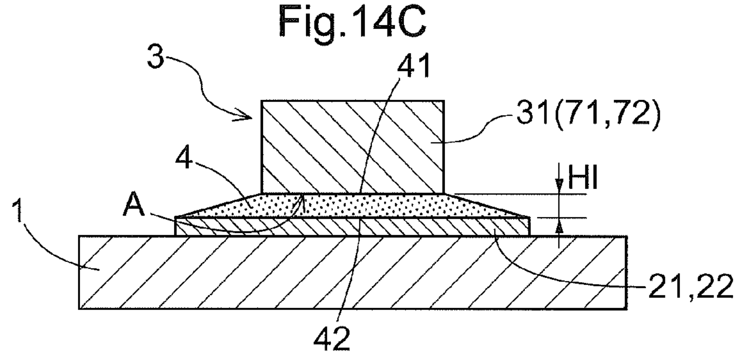
FIG. 14C is a view illustrating an example of the shape of the lead-free solder.

As the solder thickness of the lead-free solder 4, five thicknesses from 0.30 mm to 0.90 mm were set in Example 1, and five thicknesses from 0.70 mm to 1.30 mm were set in Example 2, as described in Table 1 to Table 4 as follows. The amount of the lead-free solder 4 is described based on FIGS. 14A, 14B, 14C. In FIG. 14A, Hs (uniform thickness) indicates a virtual height of the lead-free solder 4 when the lead-free solder 4 applied to the seating surface section 31, 31, 71, 72 of the connection terminal 3, 7 is present on the bus bar 21, 22 with the same area as a joining surface A. In FIG. 14B, Hh indicates a height of the lead-free solder 4, the height being higher than the virtual height Hs with the lead-free solder 4 being melted and fixed. In FIG. 14C, Hl indicates a height of the lead-free solder 4, the height being lower than the virtual height Hs with the lead-free solder 4 being melted and fixed.

2. Thermal Shock Test

A thermal shock test was performed on the connection terminals 3, 7 fixed to electric conductors on glass plates with different solder thicknesses according to Examples 1 and 2. More specifically, the connection terminal 3, 7 fixed to the electric conductor on the glass plate was subjected to 500 cycles of repetition of temperature rise within five minutes and temperature decrease within five minutes between −30° C. and 80° C. by use of a thermal shock testing device (TSA-101S (made by ESPEC Corp.)), and during the test, whether the lead-free solder 4 cracked or not was checked every 100 cycles. The connection terminals 3, 7 fixed to the electric conductors on respective glass plates with different solder thicknesses were subjected to the thermal shock test twice.

3. Terminal Bonding Strength Test

Further, after the thermal shock test, the connection terminal 3, 7 was subjected to a bonding strength test to measure its bonding strength. More specifically, the connection terminal 3, 7 was pulled up vertically (Z-axis) at a velocity of 100 mm/min to measure the bonding strength of the connection terminal 3, 7 by use of a device (an autograph (AG-50kNX (made by SHIMADZU CORPORATION))) for measuring a bonding strength.

4. Test Result

In terms of Example 1, Table 1 illustrates the result of the thermal shock test, and Table 2 illustrates the result of the terminal bonding strength test. Further, in terms of Example 2, Table 3 illustrates the result of the thermal shock test, and Table 4 illustrates the result of the terminal bonding strength test. In Table 1 and Table 3, the meanings of "OK," "Early stage," and "100" are as follows. The term "OK" means that no crack occurred in the lead-free solder 4. The term "Early stage" means that a crack was found in the lead-free solder 4 before execution of the thermal shock test (within 24 hours after solder fixation). The term "100" means that a crack was found in the lead-free solder 4 after the thermal shock test was performed by 100 cycles. In Table 2 and Table 4, the meanings of fracture modes "GB," "TB," and "GF" are as follows. The mode "GB" indicates a mode in which no breakage occurred in a joined part between the glass plate and the lead-free solder 4, but the glass plate itself was broken by a load. The mode "TB" indicates a mode in which no breakage occurred in the joined part between the glass plate and the lead-free solder 4, but a terminal was broken by a load exceeding the strength of the terminal. The mode "GF" indicates a mode in which the surface of the glass plate was broken in the joined part between the glass plate and the lead-free solder 4.

TABLE 1

| Solder thickness [mm] | Crack 1 | Crack 2 | Uniform thickness: 0.46 [mm] Uniform thickness/solder thickness | Seating surface section thickness: 0.5 [mm] Solder thickness/seating surface section thickness |
|---|---|---|---|---|
| 0.90 | OK | OK | 1.97 | 1.80 |
| 0.75 | OK | OK | 1.64 | 1.50 |
| 0.60 | OK | OK | 1.31 | 1.20 |
| 0.50 | OK | OK | 1.10 | 1.00 |
| 0.30 | Early stage | 100 | 0.66 | 0.60 |

As illustrated in Table 1, among the connection terminals 3 according to Example 1, when the solder thickness was 0.30 [mm] (the solder thickness of the lead-free solder 4 was 0.6 times of the thickness of the seating surface section 31), there were a connection terminal 3 resulting in that the lead-free solder 4 had a crack before the thermal shock test ("Early stage"), and a connection terminal 3 resulting in that a crack was found in the lead-free solder 4 after the thermal shock test was performed by 100 cycles ("100"). In the meantime, in cases of the lead-free solders 4 with respective solder thicknesses in a range of 0.50 [mm] or more but 0.90 [mm] or less which range is from 1.00 time to 1.80 times of the thickness of the seating surface section 31, no crack was found in the lead-free solders 4.

TABLE 2

| Solder thickness [mm] | | Terminal bonding strength 1 | Terminal bonding strength 2 | Average |
|---|---|---|---|---|
| 0.90 | Strength [N] | 165.0 | 184.0 | 174.5 |
| | Fracture mode | GB | TB | |
| 0.75 | Strength [N] | 184.0 | 193.0 | 188.5 |
| | Fracture mode | TB | TB | |
| 0.60 | Strength [N] | 185.0 | 189.0 | 187.0 |
| | Fracture mode | TB | TB | |
| 0.50 | Strength [N] | 181.0 | 182.0 | 181.5 |
| | Fracture mode | TB | GB | |
| 0.30 | Strength [N] | 0.0 | 46.0 | 23.0 |
| | Fracture mode | GF (Early stage) | GF (100) | |

As illustrated in Table 2, among the connection terminals 3 according to Example 1, the average of the terminal bonding strength at the time of a solder thickness of 0.30 [mm] was 23.0 [N]. Further, the averages of the terminal bonding strength at the time of solder thicknesses of 0.50 [mm] or more but 0.90 [mm] or less were 170 [N] or more. From those results, in the case of the lead-free solder 4 with a solder thickness in a range of 0.50 [mm] or more but 0.90 [mm] or less which range is from 1.00 time to 1.80 times of the thickness of the seating surface section 31, it was found that the connection terminal 3 had a sufficient bonding strength to the electric conductor disposed on the glass plate.

TABLE 3

| Solder thickness [mm] | Crack 1 | Crack 2 | Uniform thickness: 1.05 [mm] Uniform thickness/solder thickness | Seating surface section thickness: 0.8 [mm] Solder thickness/seating surface section thickness |
|---|---|---|---|---|
| 1.30 | OK | OK | 1.24 | 1.63 |
| 1.15 | OK | OK | 1.10 | 1.44 |

TABLE 3-continued

| Solder thickness [mm] | Crack 1 | Crack 2 | Uniform thickness: 1.05 [mm] Uniform thickness/solder thickness | Seating surface section thickness: 0.8 [mm] Solder thickness/seating surface section thickness |
|---|---|---|---|---|
| 1.00 | OK | OK | 0.95 | 1.25 |
| 0.95 | OK | OK | 0.91 | 1.19 |
| 0.70 | OK | OK | 0.67 | 0.88 |

As illustrated in Table 3, in terms of the connection terminals 7 according to Example 2, in cases of the lead-free solders 4 with respective solder thicknesses in a range of 0.70 [mm] or more but 1.30 [mm] or less which range is from 0.88 times to 1.63 times of the thickness of the seating surface section 71, 72, no crack was found in the lead-free solders 4.

TABLE 4

| Solder thickness [mm] | | Terminal bonding strength 1 | Terminal bonding strength 2 | Average |
|---|---|---|---|---|
| 1.30 | Strength [N] | 144.0 | 142.0 | 143.0 |
| | Fracture mode | GB | GB | |
| 1.15 | Strength [N] | 147.0 | 160.0 | 153.5 |
| | Fracture mode | GB | GB | |
| 1.00 | Strength [N] | 133.0 | 128.0 | 130.5 |
| | Fracture mode | GB | GB | |
| 0.95 | Strength [N] | 136.0 | 143.0 | 139.5 |
| | Fracture mode | GB | GB | |
| 0.70 | Strength [N] | 156.0 | 157.0 | 156.5 |
| | Fracture mode | GB | GB | |

As illustrated in Table 4, in terms of the connection terminals 7 according to Example 2, the averages of the terminal bonding strength at the time of solder thicknesses of 0.70 [mm] or more but 1.30 [mm] or less were 130 [N] or more. That is, in the case of the lead-free solder 4 with a solder thickness in a range of 0.70 [mm] or more but 1.30 [mm] or less which range is from 0.88 times to 1.63 times of the thickness of the seating surface section 71, 72, it was found that the connection terminal 7 had a sufficient bonding strength to the electric conductor disposed on the glass plate.

Modified Example of Shape of Lead-Free Solder

Figure 15:
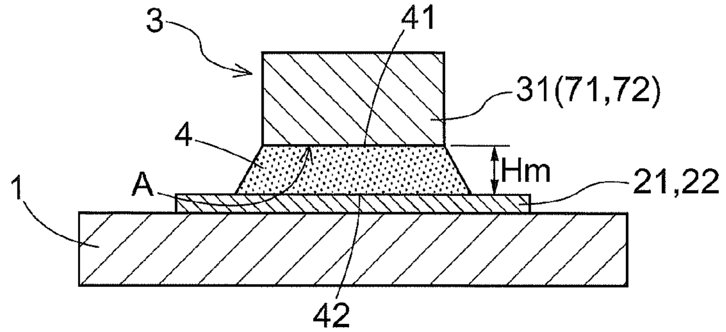
FIG. 15 is a view illustrating a modified example of the shape of the lead-free solder.

As illustrated in FIG. 15, the contact area of the lead-free solder 4 with the bus bar 21, 22 (the area of the second region 42) may be equal to or more than the contact area of the lead-free solder 4 with the seating surface section 31 (the area of the first region 41). Note that a height Hm of the lead-free solder 4 may be lower than the virtual height Hs (see FIG. 14A) of the lead-free solder 4, but it is necessary that the height Hm be a height equal to or more than two-thirds of the thickness of the seating surface section 31. Thus, when the contact area of the lead-free solder 4 with the bus bar 21, 22 is larger than the contact area thereof with the seating surface section 31, the heat capacity of the lead-free solder 4 near the seating surface section 31 increases, so that a stress caused due to contraction of the lead-free solder 4 near the seating surface section 31 is absorbed. Hereby, the stress can be made hard to be transferred to the lead-free solder 4 near the bus bars 21, 22. As a result, the lead-free solder 4 can relieve stress concentration on the peripheral edge part of the boundary between the lead-free solder 4 and the bus bar 21, 22.

Third Embodiment

Figure 17:
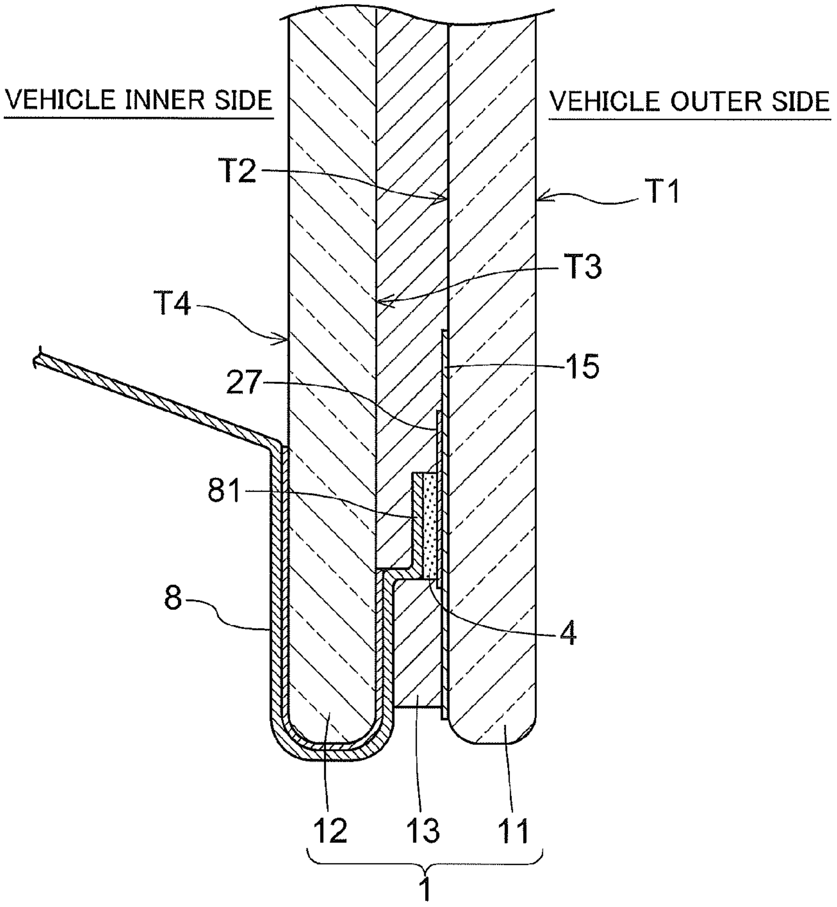
FIG. 17 is a partial sectional side view of the vehicular glass module according to the third embodiment.

The above embodiments have described an example in which the defogger 2 (the bus bars 21, 22 and the heating lines 23) as the electric conductor is provided on the glass panel 1 constituted by one glass plate. Instead of this, the glass panel 1 may be laminated glass, for example. As the laminated glass, well-known glass including an outer glass plate, an inner glass plate, and a resin interlayer disposed therebetween can be used. As illustrated in FIG. 17, the glass panel 1 as the laminated glass includes a first glass plate 11 disposed on a vehicle outer side, and a second glass plate 12 disposed on a vehicle inner side. The glass module 10 according to the third embodiment further includes a shielding layer 15 disposed in a peripheral region of the glass panel 1.

Figure 16:
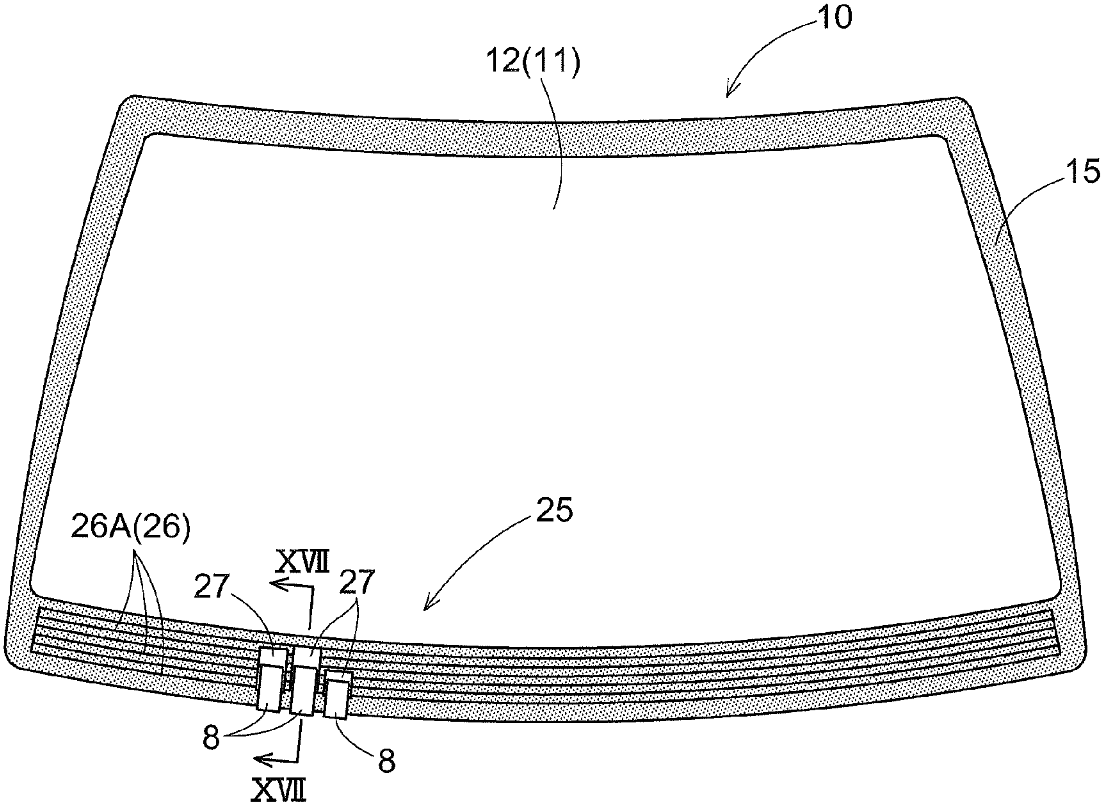
FIG. 16 is a plan view of a vehicular glass module according to a third embodiment.

As illustrated in FIGS. 16, 17, the glass panel 1 is constituted by the first glass plate 11, the second glass plate 12, and a resin interlayer 13 disposed therebetween. The interlayer 13 is not limited particularly but can be made of polyvinyl butyral, for example. In the present embodiment, the glass panel 1 includes a deicer 25 (an example of the electric conductor) described below.

The dark opaque shielding layer 15 is formed, on a second surface T2 of the first glass plate 11, in a belt shape over the whole circumference of the first glass plate 11 along its peripheral edge part. The shielding layer 15 is covered with the interlayer 13 and is bonded to the interlayer 13. The shielding layer 15 plays the role of a shade for preventing an adhesive fixing the glass panel 1 to a pillar of a vehicle body as a window frame from being observed from outside the vehicle. The shielding layer 15 is typically made of glass powder or the like and is formed such that pasty color ceramic is screen-printed and then dried and burned. Note that the surface where the shielding layer 15 is formed is not limited only to the second surface T2, and instead of or in addition to the second surface T2, the shielding layer 15 can be formed along a peripheral edge part of a fourth surface T4, for example.

The deicer 25 is a device that supplies electric power to a heating element 26A disposed on the second surface T2 of the first glass plate 11 and heats the glass panel 1 to melt ice, snow, frost, or the like attached to the first surface T1 of the first glass plate 11 or a wiper. The deicer 25 includes, in addition to the heating element 26A as an electrical element, an electrically-conductive plate 27 as a power supply section electrically connected to the heating element 26A and supplying electric power to the heating element 26A. In the present embodiment, the heating element 26A and the electrically-conductive plate 27 are disposed on the second surface T2 of the first glass plate 11 and near a peripheral edge part of the second surface T2, more specifically, near a lower part of the second surface T2. At this time, the heating element 26A and the electrically-conductive plate 27 are disposed on the shielding layer 15 so as not to disturb the view of a driver or from the viewpoint of appearance. Note that at least part of the heating element 26A and/or at least part of the electrically-conductive plate 27 may be disposed not to overlap with the shielding layer 15. In the example of FIG. 16, a plurality of electrically-conductive plates 27 is aligned, and typically, two to three electrically-conductive plates 27 are provided, but only one electrically-conductive plate 27 may be provided. The first glass plate 11 and the second glass plate 12 have respective edge surfaces generally flush with each other in the lower part where the deicer 25 is provided, as illustrated in FIGS. 16, 17.

The heating element 26A in the present embodiment is formed of many lead wires 26 extending from the electrically-conductive plate 27 and provided over the whole lower part of the shielding layer 15. The lead wires 26 form a plurality of closed loops together with the electrically-conductive plate 27. Hereby, the deicer 25 can mainly heat the whole lower part of the glass panel 1 and effectively heat the standby position of the wiper attached near a lower part of the first surface T1 outside the vehicle, and eventually, the deicer 25 can heat the wiper itself effectively.

As illustrated in FIG. 17, one end of a flat harness 8 (an example of the connection terminal) is connected to the electrically-conductive plate 27. The flat harness 8 is a member including a foil-plate shaped metal body covered with an insulating material and is formed in a plane shape as a whole. The electrically-conductive plate 27 is connected to the flat harness 8 by the lead-free solder 4. An Sn—Ag based solder is used as the lead-free solder 4.

The material of the electrically-conductive plate 27 is not limited in particular, but as a preferable example, the electrically-conductive plate 27 can be formed of a material containing at least one of Ag, Cu, Sn, Pb, and Bi. Those materials have good adhesion properties with the lead-free solder 4 and particularly excellent in a case where the flat harness 8 is fixed to the electrically-conductive plate 27 by the lead-free solder 4.

As illustrated in FIG. 17, the flat harness 8 having one end connected to the electrically-conductive plate 27 extends from the electrically-conductive plate 27 and passes through the interlayer 13 to reach a third surface T3 of the second glass plate 12. Then, the flat harness 8 is extended between the third surface T3 and the interlayer 13 and drawn out from between the third surface T3 and the interlayer 13.

The interlayer 13 has a hole penetrating therethrough generally perpendicularly to the second surface T2, and the hole is formed at a position facing a connecting part between the flat harness 8 and the electrically-conductive plate 27. The flat harness 8 rises from the electrically-conductive plate 27 to be inserted into the hole and passes through the interlayer 13 from the second surface T2 side to the third surface T3 side. The hole is formed in a slit shape to fit the shape of the flat harness 8. After the flat harness 8 is fixed to the electrically-conductive plate 27, the first glass plate 11 is joined to the interlayer 13 and the second glass plate 12.

In a case where the shielding layer 15 is provided in the glass panel 1 like the present embodiment, ceramic in deep color such as black, for example, is used as the shielding layer 15. In this case, a tensile stress occurs on the surface of the glass panel 1 due to an expansion coefficient difference between the glass panel 1 and the shielding layer 15. At this time, in a case where the lead-free solder 4 for bonding a seating surface section 81 of the flat harness 8 to the electrically-conductive plate 27 is an Sn—Ag based solder, the shielding layer 15 may crack due to a low ductility of the Sn—Ag based solder. However, since the thickness of the Sn—Ag based solder as the lead-free solder 4 is secured to be equal to or more than two-thirds of the thickness of the seating surface section 81, it is possible to relieve stress concentration on the peripheral edge of the boundary between the Sn—Ag based solder and the electrically-conductive plate 27. This can also relieve a stress applied to the shielding layer 15, thereby making it possible to restrain the occurrence of cracks in the shielding layer 15.

Fourth Embodiment

Figure 18:
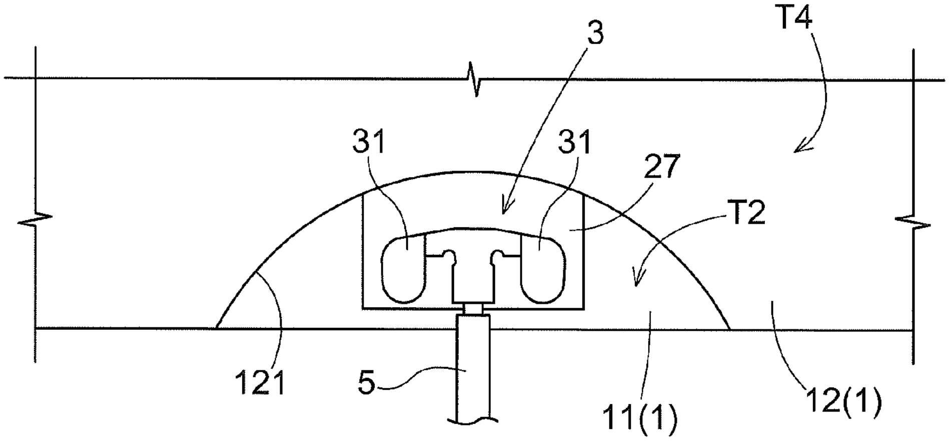
FIG. 18 is a partial plan view of a vehicular glass module according to a fourth embodiment.

Similarly to the third embodiment, the glass panel 1 according to a fourth embodiment is also constituted by laminated glass. In the fourth embodiment, as illustrated in FIG. 18, the electrically-conductive plate 27 is disposed on the second surface T2 of the first glass plate 11, and the electrically-conductive plate 27 is exposed from a notch 121 formed in the second glass plate 12. The seating surface section 31 of the connection terminal 3 is fixed to the electrically-conductive plate 27 exposed from the notch 121, via the lead-free solder 4. In this case, the first glass plate 11 can be formed of untempered glass. The electrically-conductive plate 27 disposed between the first glass plate 11 and the second glass plate 12 can be used as a power supply section for the deicer, for example. The electrically-conductive plate 27 may be disposed on a glass surface (the fourth surface T4) on the vehicle inner side of the second glass plate 12.

In a case where the glass panel 1 is laminated glass with the first glass plate 11 and the second glass plate 12 that are disposed to face each other like the present embodiment, the glass panel 1 has a small surface compressive stress as compared with a case where the glass panel is constituted by tempered glass. On that account, a crack easily occurs in the lead-free solder 4 for fixing the seating surface section 31 of the connection terminal 3 to the electrically-conductive plate 27. However, since the thickness of the lead-free solder 4 is secured to be equal to or more than two-thirds of the thickness of the seating surface section 31, it is possible to relieve stress concentration on the peripheral edge part of the boundary between the lead-free solder 4 and the electrically-conductive plate 27. As a result, it is possible to restrain the occurrence of cracks in the lead-free solder 4.

Different Embodiments (1) The above embodiments have described examples in which the connection terminal 3, 7 includes two seating surface sections 31, 31, 71, 72, but the connection terminal 3, 7 may include one seating surface section.

(2) The above embodiments have described examples in which the connection terminal 3, 7, 8 is fixed to the defogger 2 or the deicer 25, but any electrical component to which a current is supplied can be used as the electric conductor in the present invention other than the defogger 2 and the deicer 25. For example, the electrical component may be a heating line other than a bus bar, or an antenna.

(3) In the above embodiments, flax may be applied onto the bus bar 21, 22 or the electrically-conductive plate 27, and the connection terminal 3, 7, 8 may be fixed on the flax via the lead-free solder 4.

INDUSTRIAL APPLICABILITY

The present invention is widely applicable to a vehicular glass module.

DESCRIPTION OF REFERENCE NUMERALS

1: glass panel
2: defogger (electric conductor)
3, 7: connection terminal
4: lead-free solder
5: cable
6: spacer
8: flat harness (connection terminal)
10: vehicular glass module
11: first glass plate
12: second glass plate
13: interlayer
15: shielding layer
21, 22: bus bar (power supply section)
23: heating line
25: deicer (electric conductor)
26A: heating element
27: electrically-conductive plate (electric conductor, power supply section)
31, 71, 72, 81: seating surface section
32: base section
41: first region
42: second region
43: intermediate region
311, 711, 721: projection
A: joining surface
Hs: virtual height
L: thickness of seating surface section
L1, L4: projection length
L2, L5: separated distance (thickness of lead-free solder)
L3, L6: height of spacer

The invention claimed is:

1. A vehicular glass module comprising:
a glass panel;
an electric conductor disposed along a plate surface of the glass panel and including a power supply section in an end part;
at least one connection terminal configured to supply electric power to the power supply section, the at least one connection terminal being made of a conductive material having a linear thermal expansion coefficient different from the glass panel; and
a lead-free solder bonding the connection terminal to the power supply section to electrically connect the electric conductor to the connection terminal, wherein:
the connection terminal includes a plate-shaped seating surface section facing the power supply section;
the lead-free solder has a thickness equal to or more than two-thirds of a thickness of the seating surface section; and
the lead-free solder has an intermediate region between the seating surface section and the power supply section such that the intermediate region is formed to be hollowed inwardly relative to both end regions in contact with the seating surface section and the power supply section, respectively.

2. The vehicular glass module according to claim 1, wherein:
the lead-free solder has an elongation percentage smaller than an Sn—Pb based solder.

3. The vehicular glass module according to claim 1, wherein:

the seating surface section and the plate surface of the glass panel are disposed generally in parallel to each other, the plate surface facing the seating surface section.

4. The vehicular glass module according to claim 1, wherein:

the lead-free solder present between the seating surface section and the power supply section has a volume equal to or less than a product of a contact area of the seating surface section with the lead-free solder and a separated distance from the seating surface section to the power supply section.

5. The vehicular glass module according to claim 1, wherein:

the lead-free solder has a contact area with the seating surface section, the contact area being equal to or more than a contact area with the power supply section.

6. The vehicular glass module according to claim 1, wherein:

the connection terminal is made of an alloy mainly containing copper.

7. The vehicular glass module according to claim 1, wherein:

the glass panel is constituted by laminated glass including a first glass plate on a vehicle outer side and a second glass plate on a vehicle inner side such that the first glass plate and the second glass plate are disposed to face each other.

8. The vehicular glass module according to claim 1, further comprising:

a shielding layer disposed in a peripheral region of the glass panel, wherein:

the power supply section is disposed on the shielding layer; and the lead-free solder is an Sn—Ag based solder.

9. The vehicular glass module according to claim 1, wherein:

the seating surface section is a first seating surface section; and the connection terminal includes an upright section extending upward from a rear end part of the first seating surface section and an impact absorbing section connected to an upper end part of the upright section and having a U-shape in a plan view.

10. The vehicular glass module according to claim 1, wherein:

the seating surface section further includes a projection projecting toward the electric conductor.

11. The vehicular glass module according to claim 10, wherein:

the lead-free solder has a thickness larger than a length of the projection in a direction perpendicular to the plate surface of the glass panel.

* * * * *